Nov. 27, 1923.
A. M. SCHMUCK
1,475,890
BAIL SUPPORT FOR COOKING VESSELS
Filed March 30, 1922
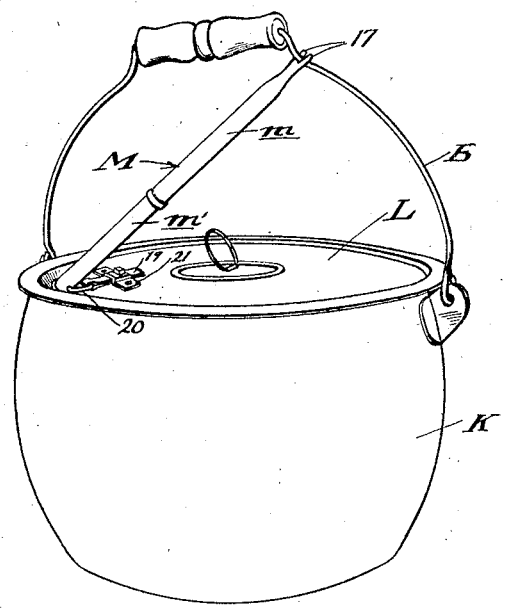
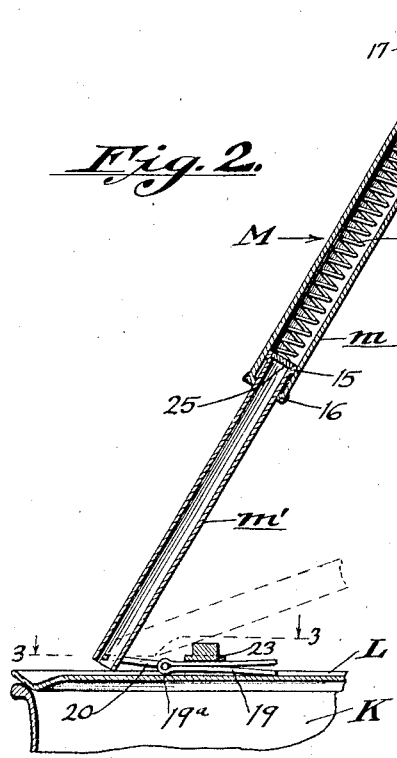
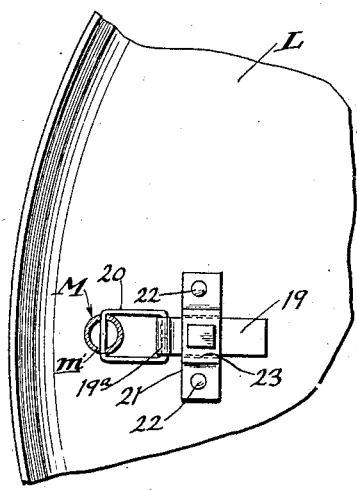
Inventor:
ALTA M. SCHMUCK.
By Hazard & Miller
Attorneys Patented Nov. 27, 1923.

1,475,890

UNITED STATES PATENT OFFICE.

ALTA M. SCHMUCK, OF PASADENA, CALIFORNIA.

BAIL SUPPORT FOR COOKING VESSELS.

Application filed March 30, 1922. Serial No. 548,035.

*To all whom it may concern:*

Be it known that I, ALTA M. SCHMUCK, a citizen of the United States, residing at Pasadena, in the county of Los Angeles and State of California, have invented new and useful Improvements in Bail Supports for Cooking Vessels, of which the following is a specification.

My invention relates to cooking vessels provided with bails, and a purpose of my invention is the provision of a support designed to sustain the bail of a cooking vessel in upright position during use to prevent the handle thereof being burnt or unduly heated.

Although I will describe only one form of bail support for cooking vessels embodying my invention and point out the novel features thereof in claims, it is to be understood that various changes and modifications may be made herein without departing from the spirit and scope of such claims.

In the accompanying drawings,

Figure 1 is a view showing in perspective a conventional form of cooking vessel having applied to the lid and bail thereof one form of bail support embodying my invention.

Fig. 2 is an enlarged fragmentary vertical sectional view of the bail support and a portion of the cooking vessel.

Fig. 3 is a sectional view taken on the line 3—3 of Fig. 2.

Referring specifically to the drawings in which similar reference characters refer to similar parts, my invention, in its present embodiment, comprises a supporting member designated generally at M and comprising a section $m$ telescopically associated with another section $m'$, the two sections being of tubular form with the section $m$ of greater diameter than the section $m'$ so that the former slidably receives the latter. As clearly shown in Fig. 2, the section $m'$ is provided at one end with an outwardly flared lip 15, while the adjacent end of the section $m$ is formed with an inwardly flared lip 16, the two lips co-operating with each other to prevent upward or outward displacement of the section $m$ and section $m'$. The free end of the section $m$ is formed with arms 17 spaced apart to provide a groove 18 in which the bail is adapted to repose as clearly illustrated in Figs. 1 and 2. The lower end of the section $m'$ is adapted to be movably associated with the lid L of a cooking vessel K by means of a connecting member. This member, in the present instance, comprises a spring clip 19 of the construction shown in Fig. 2, where it will be seen that the clip is formed from a single strip of resilient metal bent at a point medially of its ends and upon itself to provide spaced arms and an intermediate loop 19a through which latter is extended a connecting link 20. The link 20 also extends through suitable openings formed in the lower end of the section $m'$ thereby serving to pivotally connect the section with the clip. The clip is adapted to be removably secured to the lid L by means of a keeper 21 riveted to the lid at the points indicated at 22 and provided with a raised intermediate portion 23 disposed in spaced relation to the lid and of such contour as to slidably receive the clip 19. It will be understood that the tendency of the arms of the clip to expand serve to removably retain the clip within the keeper and thereby detachably sustain the support as a unit upon the vessel unit.

As clearly shown in Fig. 2, the section $m$ contains a coiled expansible spring 24, and one end of this spring bears against the plug 25 secured within the member $m'$ adjacent its upper end. The opposite end of the spring bears against the upper end of the section $m$ so as to normally urge the section upwardly or outwardly of the section $m'$.

In practice, the support is preferably associated with the bail designated at B in the manner shown in Fig. 1, although it is to be understood that it is possible to apply the support in various other ways other than that shown. The length of the two sections $m$ and $m'$ is such that when the bail is in upright position and disposed between the arms 17, the spring 24 exerts an upward tension on the bail through the medium of the section $m$, and because of its angular arrangement with respect to the lid L, it will be clear that the support serves to retain the bail in upright position so that the possibility of the flames or excessive heat reaching the bail and heating the same, or unduly heating or burning the handle thereof, is positively prevented.

What I claim is:

1. A bail support comprising members telescopically associated with each other, and means for urging one of the members to an extended position with relation to the other member.

2. A bail support comprising a supporting member including sections telescopically associated with each other, means for urging the sections to extended position with relation to each other, and means for pivotally and detachably associating the member with a vessel lid.

3. In combination, a vessel, a lid therefor, a bail sustained on the vessel, and yieldable means associated with the lid and engageable with the bail for supporting the latter in upright position with respect to the vessel.

4. A bail support comprising a supporting member including two sections telescopically associated with each other, one of said sections being bifurcated, a spring associated with the sections for normally urging the sections to extended position, and means adapted to pivotally sustain the member upon a vessel lid comprising a spring clip pivotally connected to one of the sections, and a keeper adapted to be secured to the vessel lid and removably receiving said clip.

5. A bail support comprising extensible members, and means for urging the members to extended position.

6. A bail support comprising extensible members, means for urging the members to extended position, bail engaging means on one of the members, and lid engaging means on the other member.

7. A bail support comprising members telescopically associated with each other, means for urging the members to extended position, bail engaging means on one of the members, and means for pivotally connecting the other member to a lid.

8. In combination, a vessel, a lid therefor, a bail sustained on the vessel, and extensible and yieldable means associated with the lid and engageable with the bail for supporting the latter in upright position with respect to the vessel.

9. A bail support comprising members telescopically associated with each other, and means for urging the members to extended position.

In testimony whereof I have signed my name to this specification.

ALTA M. SCHMUCK.